США008376062B2

(12) United States Patent
Wiedenmann

(10) Patent No.: US 8,376,062 B2
(45) Date of Patent: Feb. 19, 2013

(54) SOIL CULTIVATION DEVICE

(75) Inventor: Georg Wiedenmann, Rammingen (DE)

(73) Assignee: Wiedenmann GmbH, Rammingen (DE)

( * ) Notice: Subject to any disclaimer, the term of this patent is extended or adjusted under 35 U.S.C. 154(b) by 842 days.

(21) Appl. No.: 11/909,734

(22) PCT Filed: Mar. 28, 2006

(86) PCT No.: PCT/DE2006/000521
§ 371 (c)(1),
(2), (4) Date: Jul. 7, 2010

(87) PCT Pub. No.: WO2006/102869
PCT Pub. Date: Oct. 5, 2006

(65) Prior Publication Data
US 2010/0294523 A1    Nov. 25, 2010

(30) Foreign Application Priority Data

Apr. 1, 2005   (DE) .................. 10 2005 015 068
Apr. 4, 2005   (DE) .................. 10 2005 015 422
May 6, 2005    (DE) .................. 10 2005 021 025

(51) Int. Cl.
*A01B 45/02* (2006.01)
(52) U.S. Cl. .......................................... 172/21
(58) Field of Classification Search .......... 172/21, 172/22, 88, 92, 94, 95, 417, 484
See application file for complete search history.

(56) References Cited

U.S. PATENT DOCUMENTS

| 4,422,510 | A |   | 12/1983 | de Ridder |        |
|-----------|---|---|---------|-----------|--------|
| 4,750,565 | A | * | 6/1988  | Hansen et al. | 172/22 |
| 5,193,624 | A | * | 3/1993  | Wiedenmann | 172/84 |
| 5,810,092 | A |   | 9/1998  | Selvatici |        |
| 6,003,613 | A |   | 12/1999 | Reincke   |        |
| 6,199,637 | B1|   | 3/2001  | Wiedenmann |       |
| 2005/0178567 | A1 | * | 8/2005 | Wiedenmann | 172/21 |

FOREIGN PATENT DOCUMENTS

| DE | 4323315    | 1/1995  |
| DE | 19655123   | 2/1998  |
| DE | 102004018101 | 8/2005 |
| EP | 0037595    | 10/1981 |
| EP | 0791284    | 8/1997  |
| EP | 0853869    | 7/1998  |
| EP | 1040741    | 10/2000 |
| EP | 1108350    | 6/2001  |
| WO | 9502316    | 1/1995  |
| WO | 9805191    | 2/1998  |
| WO | 02080651   | 10/2002 |

* cited by examiner

*Primary Examiner* — Matthew D Troutman
(74) *Attorney, Agent, or Firm* — Novak Druce Connolly Bove + Quigg LLP

(57) ABSTRACT

A soil cultivation device drivable in a displacement direction relative to the soil and designed to break up sub-soil. The device has a chassis or frame, a row of support arms and a drive unit, respective cutting tool pivot units pivotally hinged on the support arms to pivot relative to the arms about a second pivoting axis, permitting a cutting tool fixed on the cutting tool pivot units to pierce the soil and the cutting tool pivot units to be pivoted in relation to the support arms. In addition, the device has at least one gear mechanism, which transmits the relative displacement of the cutting tool pivot unit and the support arm, which at least occurs when the cutting tool has pierced the soil and the soil cultivation device is traveling onwards in the displacement direction, to at least one unit not displaced up and down with the support arm.

24 Claims, 11 Drawing Sheets

# SOIL CULTIVATION DEVICE

This application is a §371 National Stage Application of International Application No. PCT/DE2006/000521, filed on 28 Mar. 2006, claiming the priority of German Patent Application No. 10 2005 015 068.3 filed on 1 Apr. 2005, German Patent Application No. 10 2005 015 422.0 filed on 4 Apr. 2005 and German Patent Application No. 10 2005 021 025.2 filed on 6 May 2005.

BACKGROUND

The invention relates to a soil cultivation device movable in a direction relative to the ground for subsoil loosening, having the features as set forth in the preamble of the attached claim 1.

Such soil cultivation devices are marketed in a variety of different versions and known from a plurality of patent documents such as, for example, DE 196 55 123 C2, WO 98/05191, EP 1 040 741 A2, EP 0 853 869 B1 and also EP 0 037 595 A1, all of them incorporated herein by reference.

The basic principle of such soil cultivation devices is described, for example, in EP 0 853 869 B1.

These soil cultivation devices are, for example, movably mounted articulated on a tow vehicle for riding over the ground. For example, the soil cultivation device can be mounted articulated on a reciprocating three-point linkage of a tractor or hitched trailing a tow vehicle. Soil cultivation devices have as a rule a frame (also termed chassis) for riding the ground on wheels, rollers or cylinders. These soil cultivation devices include a series of tool units for soil cultivation oriented perpendicular to the forward direction (traveling direction). Each of the tool units has (at least) one supporting arm pivotally mounted on the device chassis for reciprocation via a driving means such as particularly a crank assembly. At the other end of the supporting arm a piercing or perforating tool is articulated, for which, as a rule, a tool holder is provided as a perforating tool articulating means in which a perforating tool such as for example a tine or tine assembly or a hollow spoon or perforating tool units in the form of a bed of nails can be fixedly secured. These tool holders are pivotally articulated at the supporting arm.

As evident from FIGS. 2 and 3 of EP 0 853 869 B1 and the description thereof, lowering the supporting arms causes the perforating tool to perforate the ground. When the soil cultivation device travels further forwards, the perforating tools initially remain in the ground in the down position of the supporting arm and are pivoted relative to the supporting arm by the resistance. In this arrangement the tool holder or more generally the perforating tool articulating means is pivoted relative to the supporting arm. In all currently known generic soil cultivation devices, a stop is provided for each perforating tool or for each perforating tool holder against which each perforating tool or perforating tool holder is biased by a biasing device. In the pivoting of the perforating tool articulating means relative to the supporting arm with the tool in the ground, further traveling of the soil cultivation device causes the tool holder or an element articulated thereto to leave the stop. Then, when the supporting arm is again lifted and the soil cultivation device travels further in the forward direction, the perforating tool is drawn out of the ground and the biasing device pulls the perforating tool articulating means against the stop.

These stops and biasing devices are designed differently in prior art. As it reads from EP 0 853 869 B1 and EP 0 037 595 A1 the biasing device and the stop are configured on a telescopic rod which changes its position in operation by being reciprocated parallel to the supporting arm. In the devices as known from DE 196 55 123 C2, WO98/05191 as well as EP 1 040 741 A2, separate springs bias the tool holders against a stop provided at a setting lever.

Various attempts have been made in prior art to handle the movement of the perforating tool articulating means relative to the supporting arm, namely to bias, damp or to control and set such relative movement. It is known in particular to adjust the position of each stop to thus set the angle at which the perforating tool perforates the ground.

Movement handling means known hitherto for handling such movements are complicated in design. In addition, such handling means are also exposed to heavy wear because of the considerable amount of dirt as may materialize, particularly in hollow spoon operation. Apart from this, there is a limit to the working speed of the known devices.

BRIEF SUMMARY

The object of the invention is thus to improve a soil cultivation device having the features as set forth in the preamble of the attached claim 1 such that a design is now made available which has a longer useful life and with which higher working speeds are nevertheless attainable whilst maintaining full handling for biasing, checking, setting and similar handling movements in pivoting the supporting arm relative to the perforating tool.

This object is achieved by a soil cultivation device having the features of claim 1 and by a soil cultivation device having the features of claim 23.

Advantageous embodiments of the invention form the subject matter of the sub-claims.

Accordingly, the soil cultivation device for loosening the subsoil in accordance with the invention has, for providing a plurality of perforating tool units, a plurality of reciprocatingly actuated supporting arms articulated directly or indirectly at the device frame or chassis to pivot reciprocatingly about a first pivot axis. Furthermore, a perforating tool articulating means is articulated at each supporting arm for pivoting about a second pivot axis relative to the supporting arm. A perforating tool can be fixedly secured at the perforating tool articulating means, i.e. secured immovably relative to the perforating tool articulating means. The perforating tool may be formed for example integral with the perforating tool articulating means or, in other words, pivotally articulated at the supporting arm directly. Alternatively, as is well known in prior art, the perforating tool articulating means may be configured as perforating tool holders or the like for releasably securing various kinds of perforating tools.

The supporting arms are pivotally articulated at the frame or chassis at a first portion that may be a first end portion. The perforating tool articulating means is articulated at a second portion spaced away from the first portion and which in particular may be the other end portion of the supporting arm.

It is this articulation of the perforating tool articulating means that enables the perforating tool to perforate the ground when the supporting arm is lowered and pivoted relative to the supporting arm in further device travel so that the subsoil, for example beneath turf, is loosened. When the supporting arm is lifted during further travel of the soil cultivation device a perforating tool as a component of the perforating tool articulating means can be retracted from the ground and pivoted back to its starting position relative to the supporting arm about the second pivot axis.

The perforating tool articulating means is thus pivotable relative to the supporting arm at least with the tool perforating the ground and on further forward travel of the soil cultivation device. The basic subject of the invention is handling this movement of the perforating tool articulating means relative to the supporting arm which movement is forced by the further device travel. Preferably also the pivoting position of the perforating tool articulating means relative to the supporting arm is to be handled during the performance of the perforating. It is particularly in a parallelogram handling—known for example from EP 0 853 869 B1 and EP 0 037 595 A1—that, due to this parallelogram handling, the perforating tool articulating means and supporting arm become pivoted relatively to a certain extent also when the supporting arm is lifted. Since, however, with the supporting arm lifted the corresponding perforating tool is not active in ground cultivation, these further relative pivoting movements due to the way in which the perforating tool articulating means is guided are of lesser interest.

BRIEF DESCRIPTION OF THE DRAWINGS

These and other features, aspects, and advantages of the present invention will become better understood with reference to the following description and appended claims, and accompanying drawings where:

Figure 1:
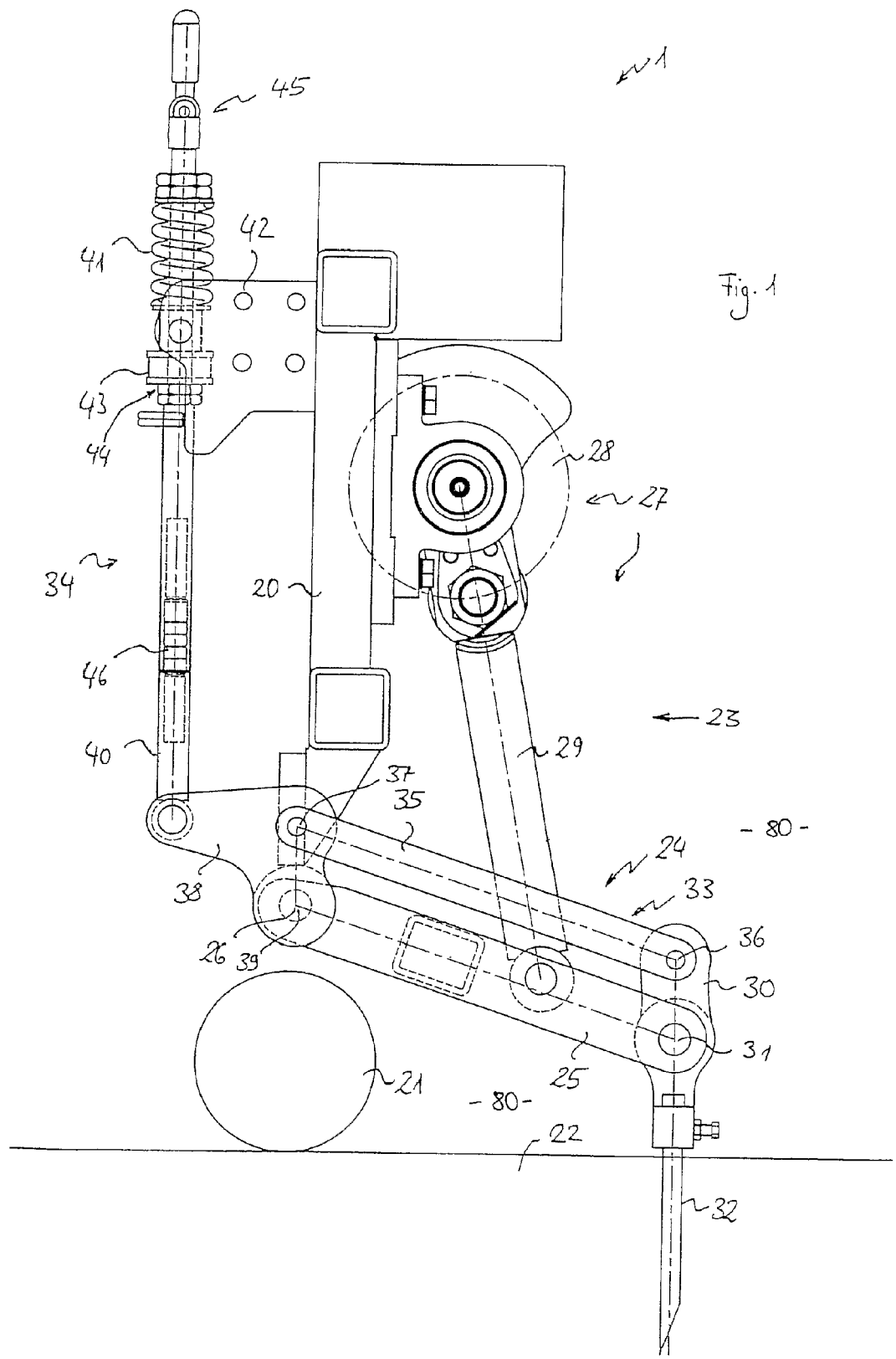
FIG. 1 is a schematic side view of one embodiment of a solid cultivation device for subsoil loosening.

It should be understood that the various embodiments are not limited to the arrangements and instrumentality shown in the drawings.

DETAILED DESCRIPTION

In accordance with a first aspect of the invention a gear mechanism is provided at at least one, preferably on several, most preferably on all tool units for communicating the movement of the perforating tool articulating means relative to the supporting arm to units or assemblies not reciprocating with the supporting arm. The gear mechanism thus receives the pivotal movement of the supporting arm relative to the perforating tool articulating means and communicates it to at least one assembly which, at the time, is not reciprocating with the supporting arm.

This enables the movement of the supporting arm relative to the perforating tool, which movement is e.g. forced by further device travel with the tool perforating the ground, to be picked off at a location other than the supporting arm. On the other hand, a perforating position of the perforating tool relative to the supporting arm can be determined at a location other than that of the supporting arm because of the gear mechanism. This now makes it possible to do away with biasing means, stops, means for setting the stops, damping means, buffer stops and the like arranged to move with the supporting arm, i.e. all such handling means serving to handle the movement of the perforating tool relative to the supporting arm can now be arranged at a fixed location on the chassis or at a location at rest relative to the chassis of the device.

This has a number of advantages. For one thing, the mass moved together with the supporting arm can now be reduced. The individual handling means are no longer reciprocated together with the supporting arm and thus are no longer exposed to the jolting impact directly experienced by the supporting arm. In addition, significant space is now gained at the supporting arm since no room needs to be provided any more for the handling means in the space required for moving the supporting arms and/or the driving means. The perforating tools themselves can now be clustered denser and/or arranged lower overall relative to the ground so that the reciprocation amplitude may be reduced and the center of gravity may be lowered.

The handling means themselves can be sited where they are out of the way of being soiled, in thus enabling them to be configured no longer susceptible to dirt.

Now, because the handling means are no longer included in the movement a wealth of options are open for designing the handling means which hitherto were not available or only with considerable complications.

Thus, it is now possible to make use of far more sophisticated damping means including fluid dampers which can also be ported to a central fluid feed.

Again, because the handling means no longer needs to be configured slaved in the movement, the supporting arms can now be reciprocated faster without detrimenting the useful life of the handling means which in prior art are considerable larger and, above all, are continually exposed to acceleration forces.

The gear mechanism itself communicating the relative movement of each supporting arm from the system of coordinates slaved in the movement of the supporting arm e.g. into the system of coordinates of the device chassis at rest can be engineered differing completely. For instance, it could also take the form of a chain gear mechanism or a gear shaft located in or on the supporting arm. Preferably the gear mechanism is to be engineered so that the relative movement can be communicated as directly as possible and with minimum clearance from the system slaved in the movement of each supporting arm.

Thus, at this time, preference is given to a gear mechanism which is formed by a linkage articulatedly linked to the perforating tool articulating means for direct common movement together therewith.

For enabling the linkage to communicate the relative movement from the moved system with minimum influence by the movement of the supporting arms, the linkage should guide the movement as near as possible to the first pivot axis where the supporting arm is articulatedly linked to the device frame and thus interfaces the system at rest. It is here in this area near the pivot axis that the movement can be tapped for biasing, control, damping, setting and/or checking or like handling activities.

The gear mechanism for transferring or communicating the pivotal movement between supporting arm and perforating tool articulating means from or out of the system slaved in the movement of each supporting arm is preferably formed substantially of a rigid rod element acting roughly parallel to the supporting arm and a redirecting element. The rigid rod element is joined to the perforating tool articulating means by a first articulation point, preferably at an end portion in thus being able to fully communicate or transfer any movement of the perforating tool arranged thereon relative to the supporting arm without any losses. It is not necessary that the rod element is configured as a straight rod; only a rigid transmission between two articulation points is important. Any unit or assembly satisfying this requirement of communicating a movement of a first articulation point to second articulation point distanced away therefrom by essentially rigid ways and means is termed in the present context a rigid rod element. In operation the rod element is required to ensure rigid transmission between the articulation points. To permit adapting to the various requirements the rod element may also be designed so that its effective length, i.e. the length between the two articulation points, is adjustable selectively to be then fixed for operation. This may be done in various ways. For example, the rod element could be configured with multiple holes, each of which can serve optionally as articulation points in operation. It is just as possible to engineer the rod element as two elements in a telescopic arrangement each being fixed relative to the other in selectable length. As a further alternative, the rod element may take the form of a screw clamp comprising two threaded elements for fixing optionally selectable each relative to the other via a screw clamp.

The redirecting element is then articulated at the second articulation point of the rod element so that the redirecting element is slaved in the movement of the rigid rod element initiated by movement of the perforating tool articulating means relative to the supporting arm.

This relative movement can be tapped at this redirecting element, i.e. for example biased, limited by stops, damped, adjusted, checked, regulated or handled by some other ways and means.

Accordingly, the gear mechanism has preferably a redirecting element for redirecting the relative movements initiated in perforating, by further device travel and after the pulling of the perforating tool out of the ground. This redirecting element is preferably pivotable about a third pivot axis at the device frame or chassis in thus being mounted fixed to the frame. The third pivot axis is oriented approximately parallel to the first and approximately parallel to the second pivot axis. It is particularly preferred that the third pivot axis coincide with the first pivot axis about which the supporting arm is pivotally mounted at the frame, since the first pivot axis is the interface between the moved system and system at rest and a movement in the moved system can be communicated or transferred particularly simply by a redirecting element engaging this interface into the system at rest without being influenced by the movement of the supporting arm.

In accordance with another aspect of the invention, a stop—as known per se in principle—reciprocating with the supporting arm is provided, wherein the stop can be adjusted via a gear mechanism to set a perforating angle for the perforating tool concerned. Furthermore, a biasing means slaved in the movement of the supporting arm is provided which biases the perforating tool articulating means against the stop. Although this configuration still has the same disadvantages as already explained in prior art as regards the handling means slaved in the movement, it is, however, already known to set the stops of a plurality of perforating tools in common via a central setting. For this purpose the gear mechanism is mounted with a redirecting element in the vicinity of the first pivot axis, each redirecting element of the perforating tools to be set in common engaging a common perforating angle positioning means.

The problem with such a configuration hitherto was that the bearings of such redirecting elements need to be replaced new after a relatively short time. On every working cycle the perforating tool was retracted against the stop impacting the redirecting element and its bearings. For this purpose plain bearings were employed hitherto, which however quickly became worn out and featured a corresponding high friction resistance right from the start. Bearings of this kind also require frequent maintenance. Tests with rolling contact bearings on existing structures proved to be a failure, the rolling contact members having become broken down after a relatively short time. All of these disadvantages can be avoided by mounting the redirecting element of the gear mechanism not only in the vicinity of the first pivot axis but pivotally mounted about the first pivot axis at the device frame, resulting in the redirecting element being pivotally mounted concentrically to the mount. In accordance with the invention one of the races or of the same bearing elements is now connected to be slaved in common in the movement with the supporting arms. In other words, this race or the like is slaved in the movement of the supporting arm and is thus continually turned about the bearing axis in a certain angular range. The rotational or pivotal bearing mounting the redirecting element is in movement all the time, resulting in each impact communicated via the perforating tool to the redirecting element now always occurring at a different location in the bearing. Each impact is now distributed about the bearing, and there is no danger that the bearing seizes up. This now makes it possible to employ rolling contact bearings such as ball bearings with no problem since no single rolling contact member is subject alone to impact.

In a preferred embodiment a pin fixedly connected to the supporting arm is configured concentrically jutting away from the first pivot axis for mounting a rolling contact bearing seating in turn the redirecting element of the gear mechanism.

This configuration now makes it possible to work at higher speed even in the otherwise conventional type in which the handling means are slaved in the movement whilst still achieving a longer life of the device in all with less need for maintenance.

Particularly preferred is a combination of both aspects of the invention in which a gear element of the gear mechanism communicating the relative movement of the perforating tool and perforating tool articulating means on the other hand, and supporting arm, on the other, from the system slaved in the movement of the supporting arm is mounted on the device frame by a rotary or pivot bearing, the bearing axis of which coincides with the first pivot axis about which the corresponding supporting arm is pivoted. One of these bearing elements of the rotary or pivot bearing is configured in a preferred embodiment slaved in the rotation with the supporting arm so that in the design in accordance with the second aspect of invention too, the aforementioned advantages of low bearing wear and a low maintenance requirement for the bearings are achieved. Due to the bearing axis coinciding with the first pivot axis, the gear element, particularly the aforementioned redirecting element, can also be mounted on the supporting arm without it being slaved in the reciprocation thereof. The movement of the supporting arm merely results in a relative rotation of the corresponding bearing elements with the advantages as commented above. However, even with movement of the supporting arm and despite mounting of the bearing on the supporting arm the position of the bearing in all remains stable in position relative to the device frame or chassis in thus enabling the pivoting of the perforating tool relative to the supporting arm to be picked off and handled at the gear element of the gear mechanism mounted in this way.

Further advantageous embodiments of the first aspect of the invention will now be detailed.

Particularly, when the gear mechanism is designed as a linkage, it is preferred that this linkage forms together with the supporting arm and the perforating tool articulating means a more or less parallelogram guide. As known basically from EP 0 037 595 A1 a parallelogram guide permits achieving, irrespective of the position of the supporting arm, a consistent angle between perforating tool and ground. This angle can be set by a redirecting element which acts parallel to the articulation of the perforating tool and is mounted articulated at the perforating tool articulating means by a rigid rod element guided parallel to the supporting arm. Correspondingly, automatic pivoting of the perforating tool articulating means results in corresponding pivoting of the redirecting element when the perforating tool perforates the ground and in further device travel. Due to the at least approximate parallelogram guide the position of the redirecting element remains independent of the position of the supporting arm and thus substantially independent of the movement of the supporting arm. Therefore, this relative movement can be handled at the redirecting element with the aid of an handling means arranged stationarily relative to the device frame or chassis.

The handling means serves particularly to return the perforating tool pulled out from the ground back into its original position. For this purpose, as happened before in the moved systems, a biasing means can be provided in the stationary system which biases the gear mechanism, for example the redirecting element, against a stop. The stop too, can then be arranged in the stationary system. The position of the stop itself is adjustable. Furthermore, buffers or more complicated damping means may be provided for damping.

It is particularly preferred to arrange this handling means in an area located, as viewed in the direction of forward travel, on the side opposite that of the supporting arms from the first pivot axis. In the example in which the soil cultivation device is hitched to the rear of a tractor and in which the supporting arms extend away from the first pivot axis against the direction of forward travel, it is preferred to attach the handling means to the front of the soil cultivation device, for example, to a front wall of the device chassis where there is enough room for various kinds of handling means. More sophisticated damping systems as well as fluid dampers, for example, hydraulic dampers, may be provided. It is also just as possible to apply various other connectors—for example fluid connectors and hydraulic or compressed air connection—to the handling means sited opposite the device frame or chassis in thus making for an enormous increase to the design options for biased means, stop assemblies, control elements, etc.

In any case, a gear mechanism in accordance with the invention can be provided with each perforating tool unit, i.e. each supporting arm assembly. In one preferred embodiment each of these gear mechanisms is mounted articulated at a separate handling means, for example, a separate bias means, a separate stop and/or a separate damper means. For each perforating tool unit a separate stop setting or other setting of the perforating angle can be provided. It is, however, just as possible to provide a central angle setting means with which all, or a group of the gear mechanisms can be set in common as regards the bearings for perforating angle.

Yet another advantage substantial to the invention is the possibility of improved noise damping when the movement of the perforating tool relative to the supporting arm is communicated from the system slaved in the movement of the supporting arm for example into an system at rest relative to the device frame. Since springs, dampers, stops and the like can be arranged at rest the means existing singly corresponding to each perforating tool unit can be grouped together in a module for noise damping in common. When, for example, such handling means are clustered on a front wall of the soil cultivation device, they could be covered in all by a hood lined with noise damping materials.

Example embodiments of the invention will now be detailed with reference to the accompanying drawing in which FIGS. 1-11 are comparable side views of the salient components of eleven embodiments of soil cultivation devices for subsoil loosening showing part of the device frame and tool units with supporting arms for powered reciprocation with the perforating tool articulating means articulated thereto.

The FIGS. each show a side view transversely to the forwards travel direction illustrating the salient components of various embodiments of a soil cultivation device for subsoil loosening. Components typical to such devices as are well known from prior art—see for example the patents as cited in the background description—have been omitted to make for a better overview. As a rule the soil cultivation devices as involved feature a plurality of tool units arranged and distributed on the soil cultivation device perpendicularly to its forwards travel direction. A view in perspective of such a distribution is evident, for example, from the German patent application DE 10 2004 018 101 A1, incorporated herein by reference and to which express reference is made as regards further details of the soil cultivation devices concerned presently.

The FIGS. 1 to 11 show all eleven embodiments of soil cultivation devices indicated in general with the reference numbers 1-11 respectively. Each soil cultivation device 1-11 has a device frame 20 for riding over the ground 22 in a forwards direction of travel 23 by means of rollers 21.

A train of identically configured tool units 24 is provided into the plane of the illustration, only one of which is shown in each FIG. Each tool unit 24 has a supporting arm 25 which for example, may be a bar, but preferably, however, each supporting arm 25 is formed by a plurality of welded parallel bars each joined to the other. The supporting arm 25 is articulated to pivot about a first pivot axis 26 directly or indirectly at the device frame 20 such that the first pivot axis 26 is located stable attached to the device frame 20. The supporting arm 25 is engaged by a driving means 27 with a crank assembly 28 and an driving rod 29 which pivotally reciprocates the supporting arm 25 about the first pivot axis 26. A perforating tool articulating means in the form of a tool holder 30 articulated-mounted, pivotally relative to the supporting arm 25 about a second pivot axis 31, to the free end of the supporting arm 25. Accordingly, the second pivot axis 31 and the tool holder 30 move upward and downward together with the supporting arm 25. Fixedly but releasably secured to the tool holder 30 is a perforating tool 32 for perforating the ground 22.

Provided in the embodiments as shown in FIGS. 1 to 10 is a gear mechanism provided in this case in the form of a first linkage 33, transferring a relative pivoting of supporting arm 25 and tool holder 30 into the vicinity of the first pivot axis 26 for picking off there by a handling means 34 arranged stationarily relative to the device frame 20. The linkage 33 comprises a rigid rod element, in this case in the form of a straight rigid rod 35, the length of which cannot be varied having a first point of articulation 36 and a second point of articulation 37 spaced away from the first point of articulation in the longitudinal direction of the rod 35. By its first point of articulation 36 at one end the rod 35 is fixedly but pivotally mounted articulated at the tool holder 30. The pivot axis running through the first point of articulation 36 (into the plane of the drawing) about which the first point of articulation 36 can be pivoted to the tool holder 30 is located spaced away from and parallel to the second pivot axis 31. The rod 35 runs approximately parallel to the supporting arm 25 and the spacing of the points of articulation 36, 37 roughly corresponds to the spacing of the first pivot axis 26 from the second pivot axis 31. Thus, the second point of articulation 37 is located relative to the the first pivot axis 26 in a corresponding manner as the first point of articulation 36 is located relative to the second pivot axis 31. In other words the points of articulation 36, 37 and the first and second pivot axis 26, 31 form at least approximately a parallelogram.

In the first to tenth example embodiment 1-10 the gear mechanism formed by the first linkage 33 further comprises a redirecting element 38 which is mounted pivotally about a third pivot axis 39 at the device frame 20. In the embodiments 1-5, 7-10 with the exception of the sixth embodiment 6 the third pivot axis 39 coincides with the first pivot axis 26, i.e. in this case the redirecting element 38 is mounted in this case concentric to the pivotal mount of the supporting arm 25. In all embodiments 1-10 as shown in FIGS. 1 to 10 the redirecting element 38 engages the handling means 34.

In the first embodiment of a soil cultivation device 1 as shown in FIG. 1 a rod 40 of variable length engages the redirecting element 38. At the other end the rod 40 is biased by a biasing means in the form of a compression spring 41. The compression spring 41 is supported at its other end by the device frame 20. Provided furthermore at the support 42 is a damper in the form of a buffer 43. The rod 40 is provided with a projection 44 or nose with which it is stopped by the buffer 43 acting as a stop. In the embodiments 1 and 2 this projection 44 is formed by nuts 44'. When the rod 40 contacts the buffer 43 the rod 40 is biased by the compression spring 41. By a crank 45 a spindle 46 can be rotated in the interior of the rod 40 in thus setting the length of the rod 40, as a result of which the location of the articulation A of the rod 40 at the redirecting element 38 is adjustable relative to the buffer 43. This enables the resting position of the redirecting element 38 and thus the perforating angle of the perforating tool 32 to be set relative to the ground 22 so that the crank 45/spindle 46 of the rod 40 acts as an angle setter. In operation the supporting arm 25 is moved up and down without influencing the location of the redirecting element 38. But when the tool holder 30 is pivoted about the second pivot axis 31 this movement is communicated via the first linkage 33 to the rod 40 which can be moved downward contrary to the tension force of the compression spring 41 when the perforating tool is penetrating the soil and the soil cultivation device is traveling further in direction of travel. As soon as the perforating tool 32 is released the compression spring 41 pulls the rod 40 upward back into contact with the buffer 43 which cushions the impact. Although pivoting of the tool holder 30 occurs in the system slaved in the movement of the supporting arm 25, the whole handling means 34 can be arranged stationarily relative to the device frame at the front wall of the device frame 20.

Figure 2:
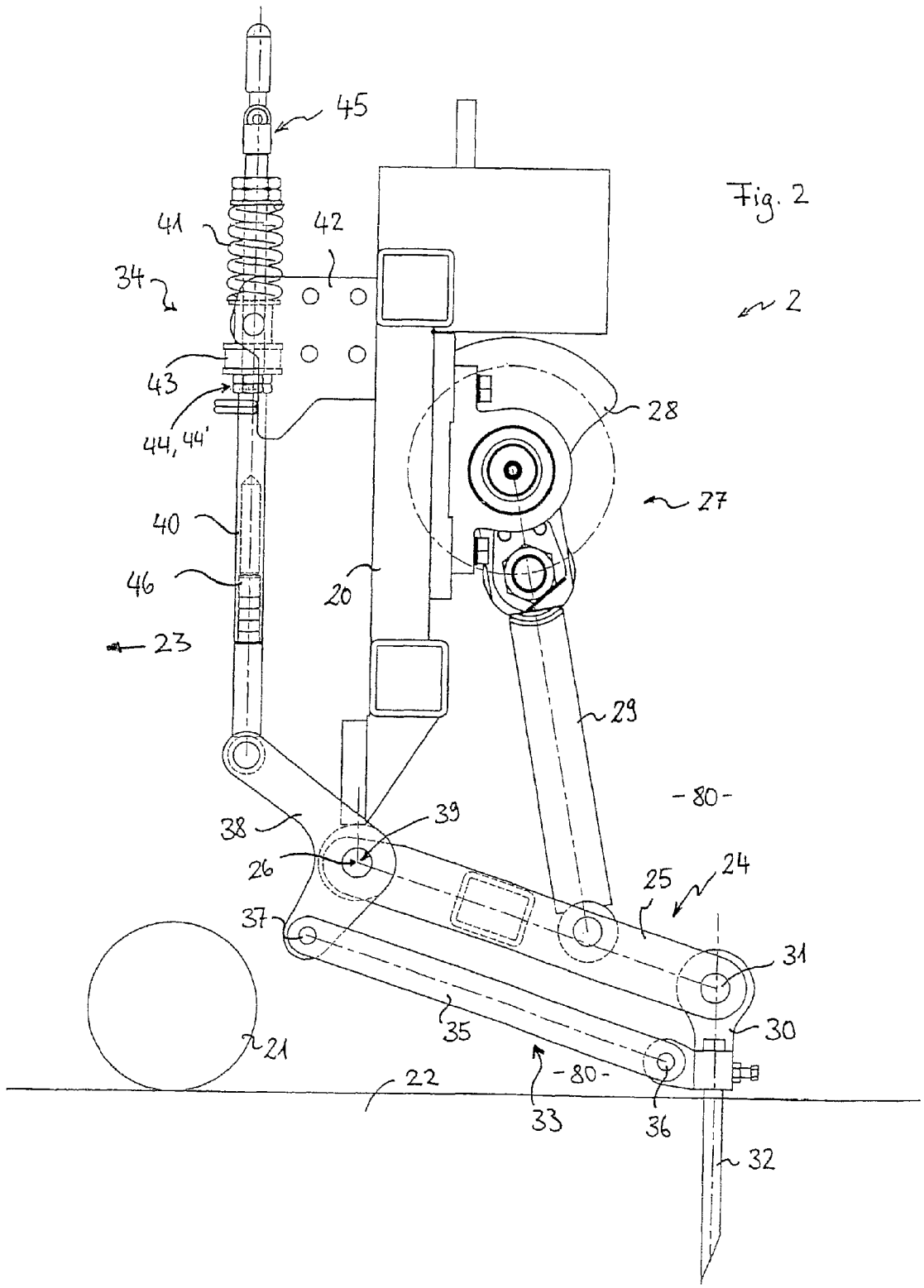
FIG. 2 shows a schematic illustration of a second embodiment of a soil cultivation device.

Referring now to FIG. 2 there is illustrated how in the second embodiment of a soil cultivation device 2 as shown therein, unlike in accordance with the first embodiment of the soil cultivation device as shown in FIG. 1 in which the rigid rod 35 of the linkage 33 is arranged above the supporting arm 25, this rod 35 is now located below the supporting arm 25. In all other aspects, the second embodiment corresponds to the first embodiment.

Figure 3:
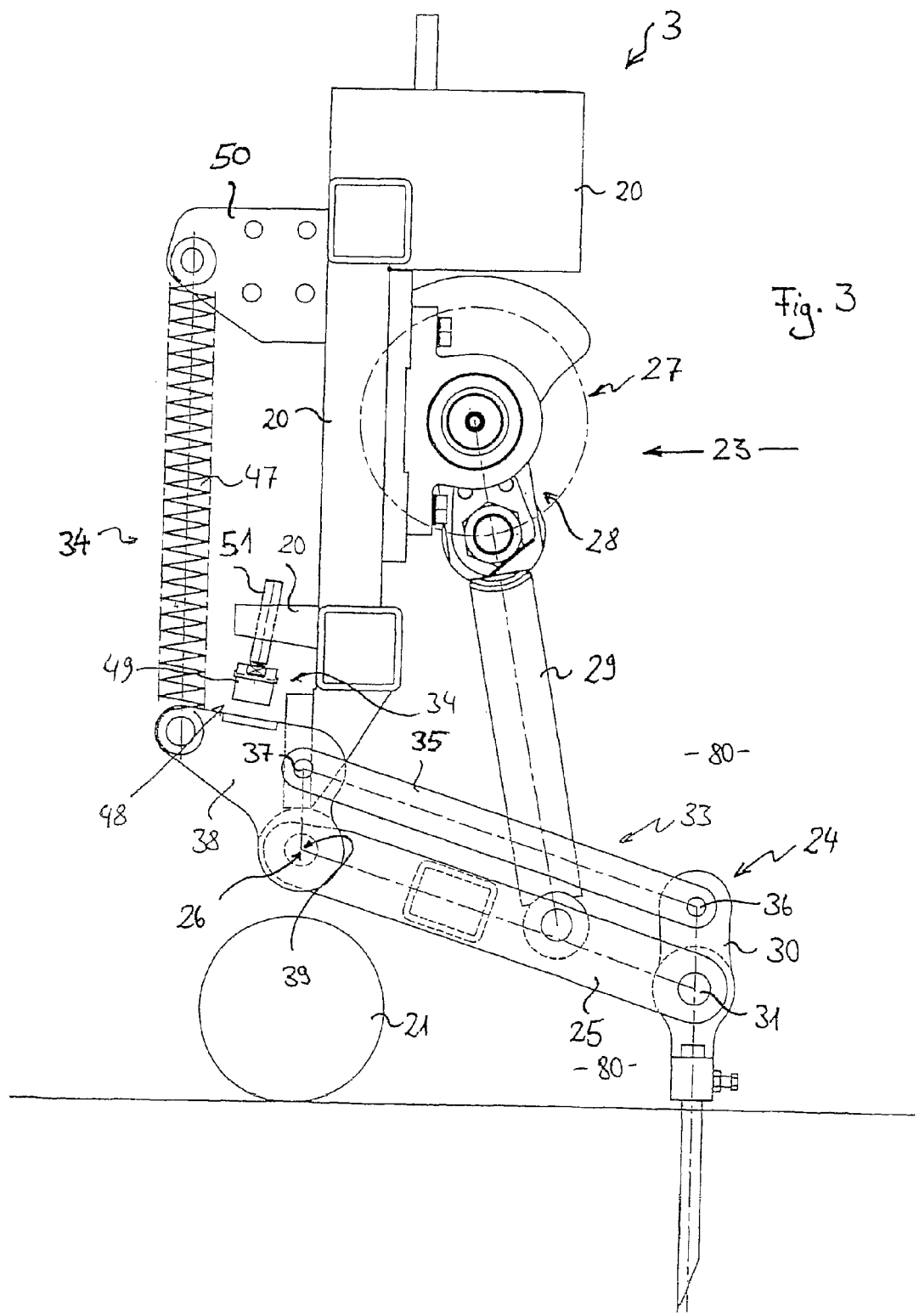
FIG. 3 shows a schematic illustration of a third embodiment of a soil cultivation device.

Referring now to FIG. 3 there is illustrated a third embodiment of a soil cultivation device 3 which as regards the location of the rod 35 of the linkage 33 again is based on that of the first embodiment from which it differs by the configuration of the handling means 34. As evident from FIG. 3 the handling means 34 includes in the soil cultivation device 3 as a biasing means a tension spring 47 biased between a holder 50 rigidly connected to the device frame 20 and the redirecting element 38 and, defined at a further location on the device frame 20, a stop 48 for the redirecting element 38 directly. The stop 48 is in turn provided with a buffer 49 as a damping means located on a threaded pin 51 engaging a tapping in the device frame 20 so that the position of the stop 48 for setting the perforating angle is adjustable.

Figure 4:
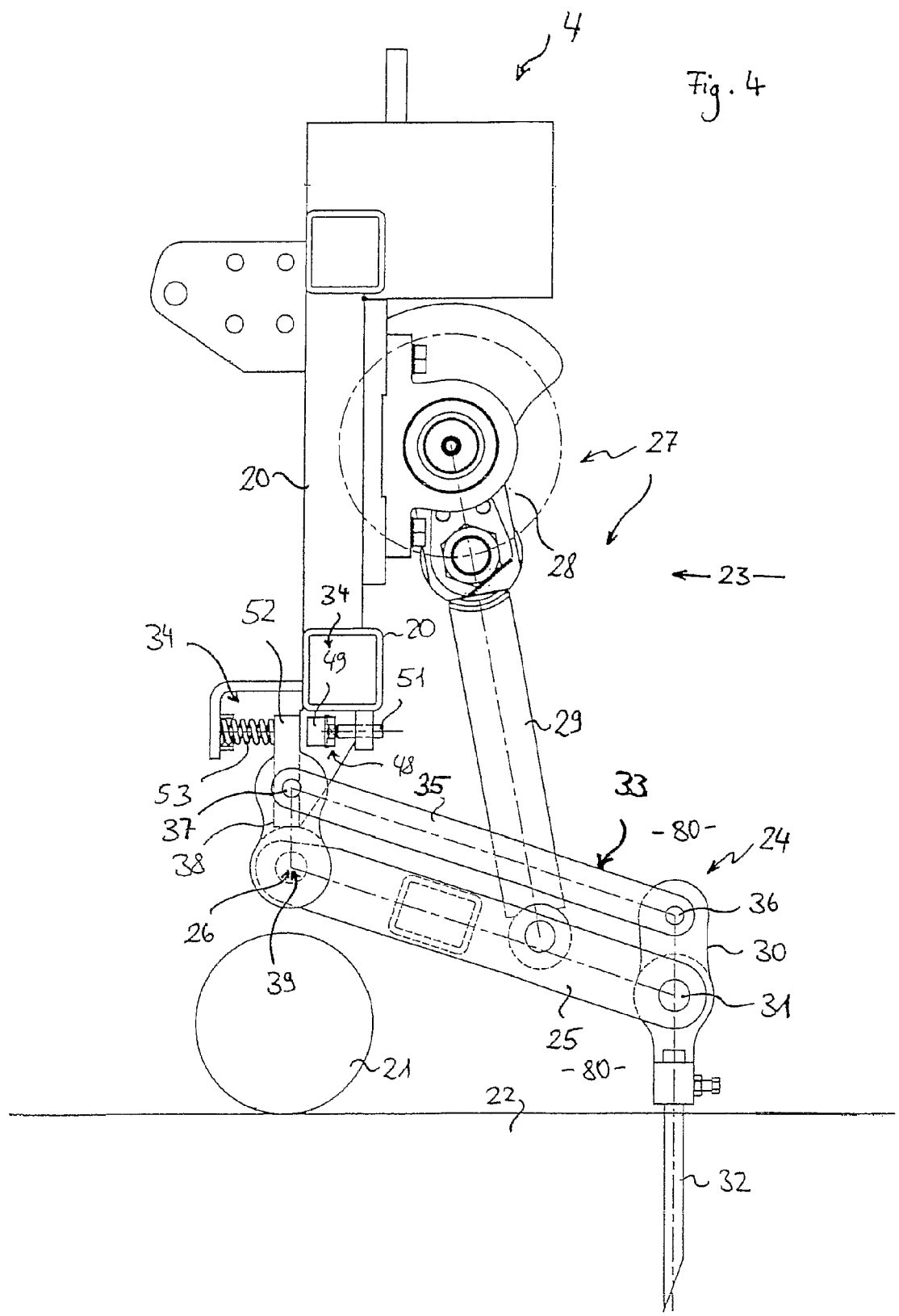
FIG. 4 shows a schematic illustration of a fourth embodiment of a soil cultivation device.

Referring now to FIG. 4 there is illustrated a fourth embodiment of a soil cultivation device 4 which is very similar to the third embodiment, except that a compression spring 53 directly engaging the redirecting element 38 at one side of a projection, lever arm or extension 52 is provided as the biasing means urging the extension 52 in contact with the stop 48 engaging at the other side of the extension 52 known in principle from the third embodiment.

Figure 5:
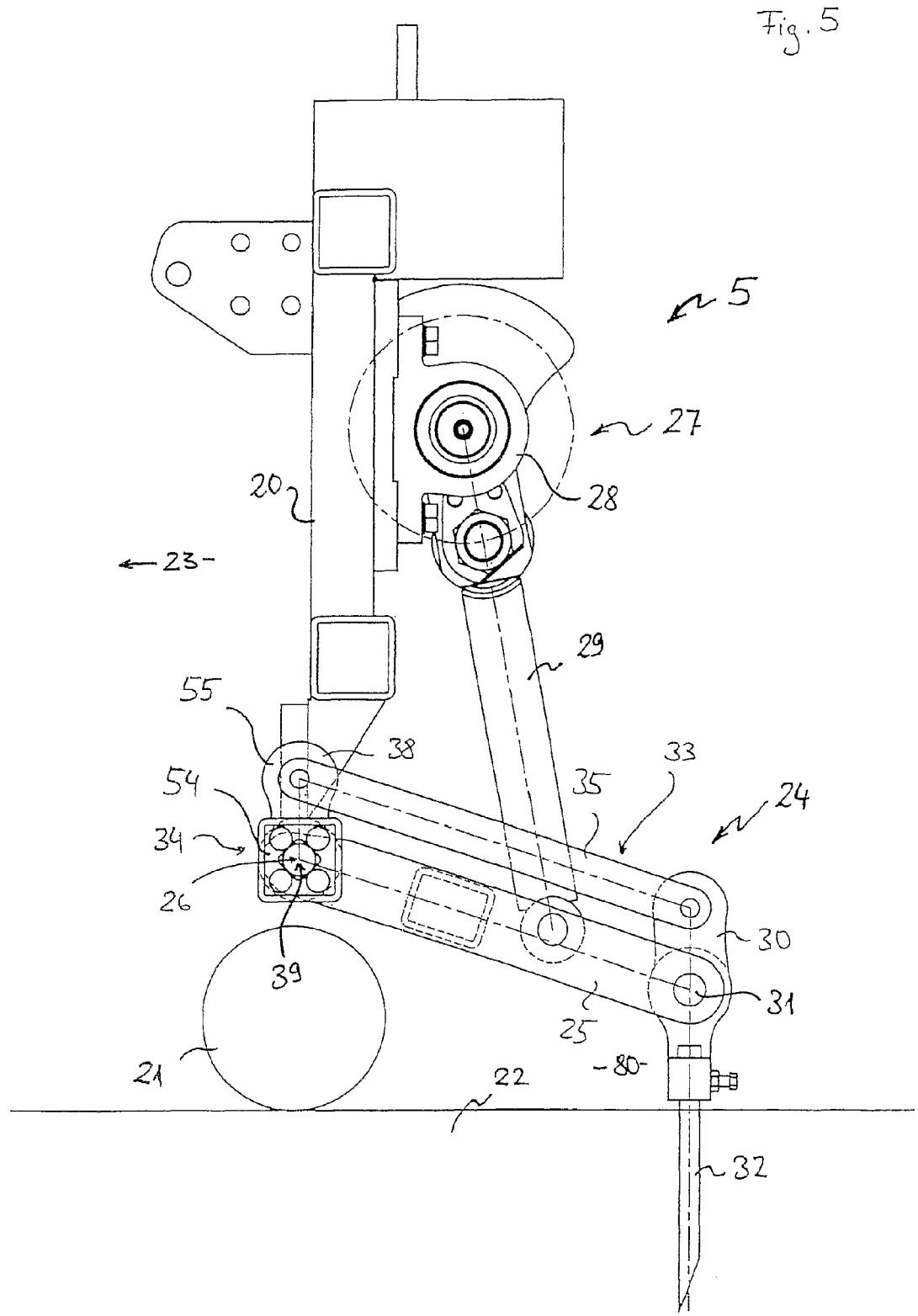
FIG. 5 shows a schematic illustration of a fifth embodiment of a soil cultivation device.

Referring now to FIG. 5 there is illustrated a fifth embodiment of a soil cultivation device 5 in which no adjustment of the perforating angle is provided. This embodiment is of interest for simpler, more cost-effective versions. The redirecting element 38 is not mounted free to rotate but flexibly pivotally mounted. The redirecting element 38 is pivotally connected to the device frame 20 via an elastomer 54. The elastomer 54 retains the redirecting element 38 in the position of rest as shown in FIG. 5 whilst permitting pivoting of the redirecting element to both sides about the third pivot axis 39 to a certain extent. This pivoting happens, for example, every time the tool holder 30 is pivoted about the second pivot axis 31 in perforating. On release of the perforating tool 32 the elastomer 54 retracts the redirecting element 38 and thus the tool holder 30 back to the position at rest.

Figure 6:
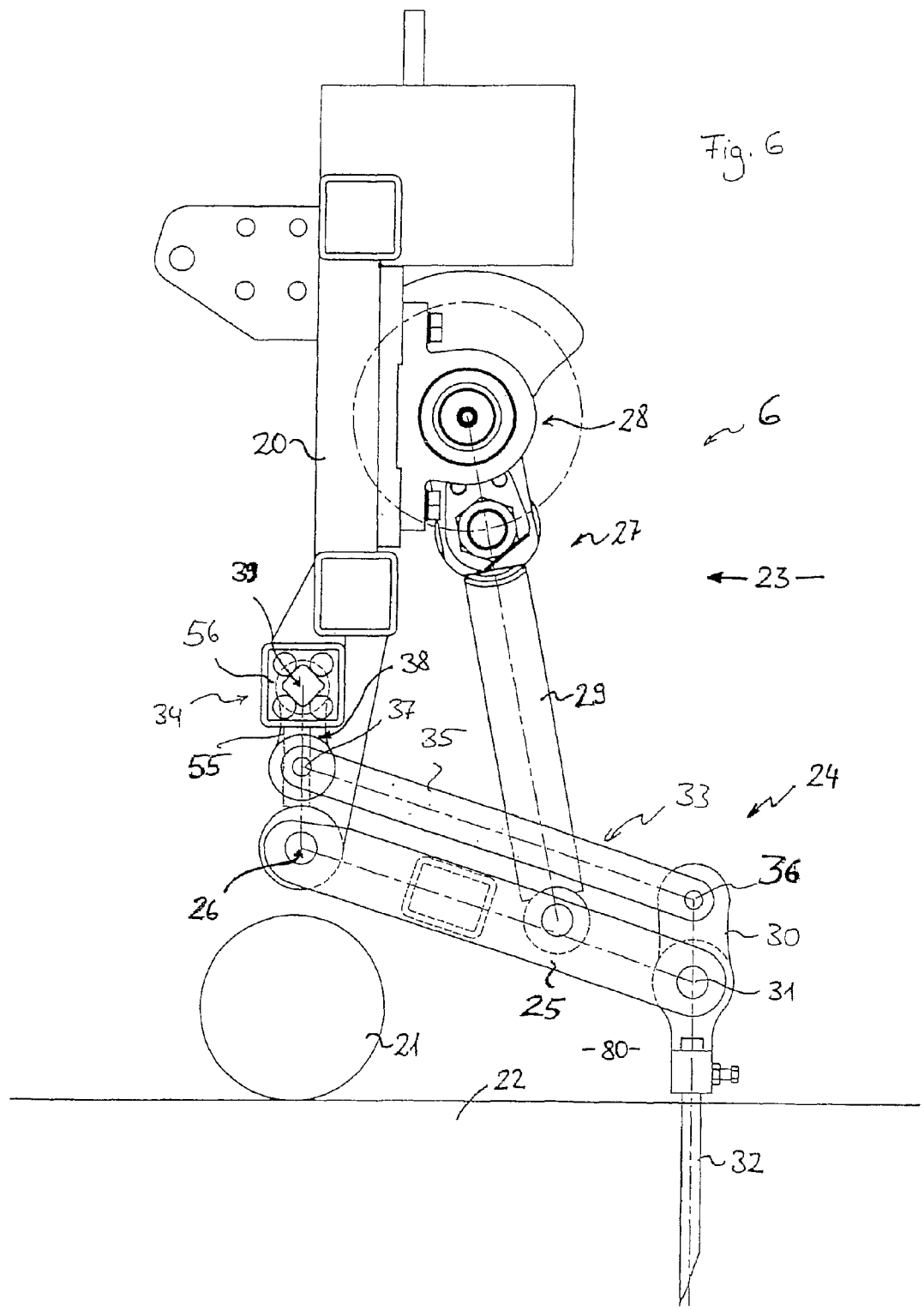
FIG. 6 shows a schematic illustration of a sixth embodiment of a soil cultivation device.

Referring now to FIG. 6 there is illustrated a sixth example embodiment of a soil cultivation device 6 showing that the design principle as explained with reference to FIG. 5 also functions when the redirecting element 38 is not pivotally articulated concentrically to the first pivot axis 26. It is sufficient to flexibly mount the second point of articulation 37. In the sixth example embodiment of the soil cultivation device 6 a lever element 55 as a redirecting element is mounted at an elastomeric mount 56 to a certain extent flexibly pivotable about the third pivot axis 39 running here above the first pivot axis 26.

Figure 7:
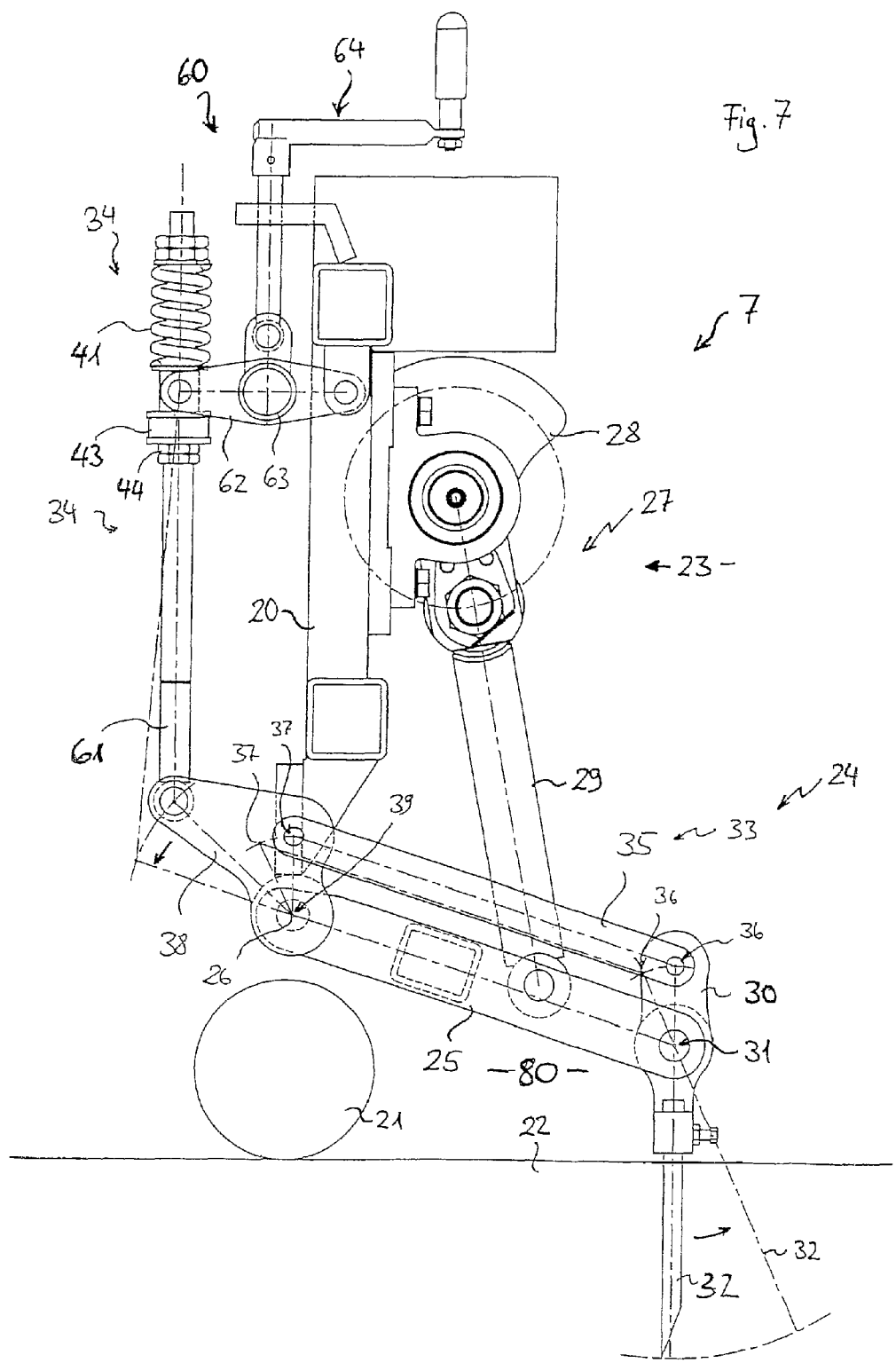
FIG. 7 shows a schematic illustration of a seventh embodiment of a soil cultivation device.

Referring now to FIG. 7 there is illustrated a seventh example embodiment of a soil cultivation device 7 which is in turn based on the first embodiment from which it differs by instead of a separate angle setting for each tool unit 24 a central angle positioner 60 is now provided with which the perforating angle can be set in common for a plurality of tool units 24. For this purpose the rod 40 whose length can be varied is replaced by a rod rod 61 which length cannot be varied and instead of the rigid support 42 a variable support 62 is now provided whose position relative to the device frame 20 is adjustable. Using an setting rod 63 extending crosswise to the direction of movement, the variable support 62 of a plurality of rods 61 can now be set in common. For this purpose, the setting rod 63 is pivotally mounted, for example cantilevered, at the device frame 20, the pivoting angle being adjustable via a setting crank 64. Otherwise this soil cultivation device 7 according to the seventh embodiment corresponds to soil cultivation device 1 according the first embodiment; also the stop buffer 43 is provided.

Figure 8:
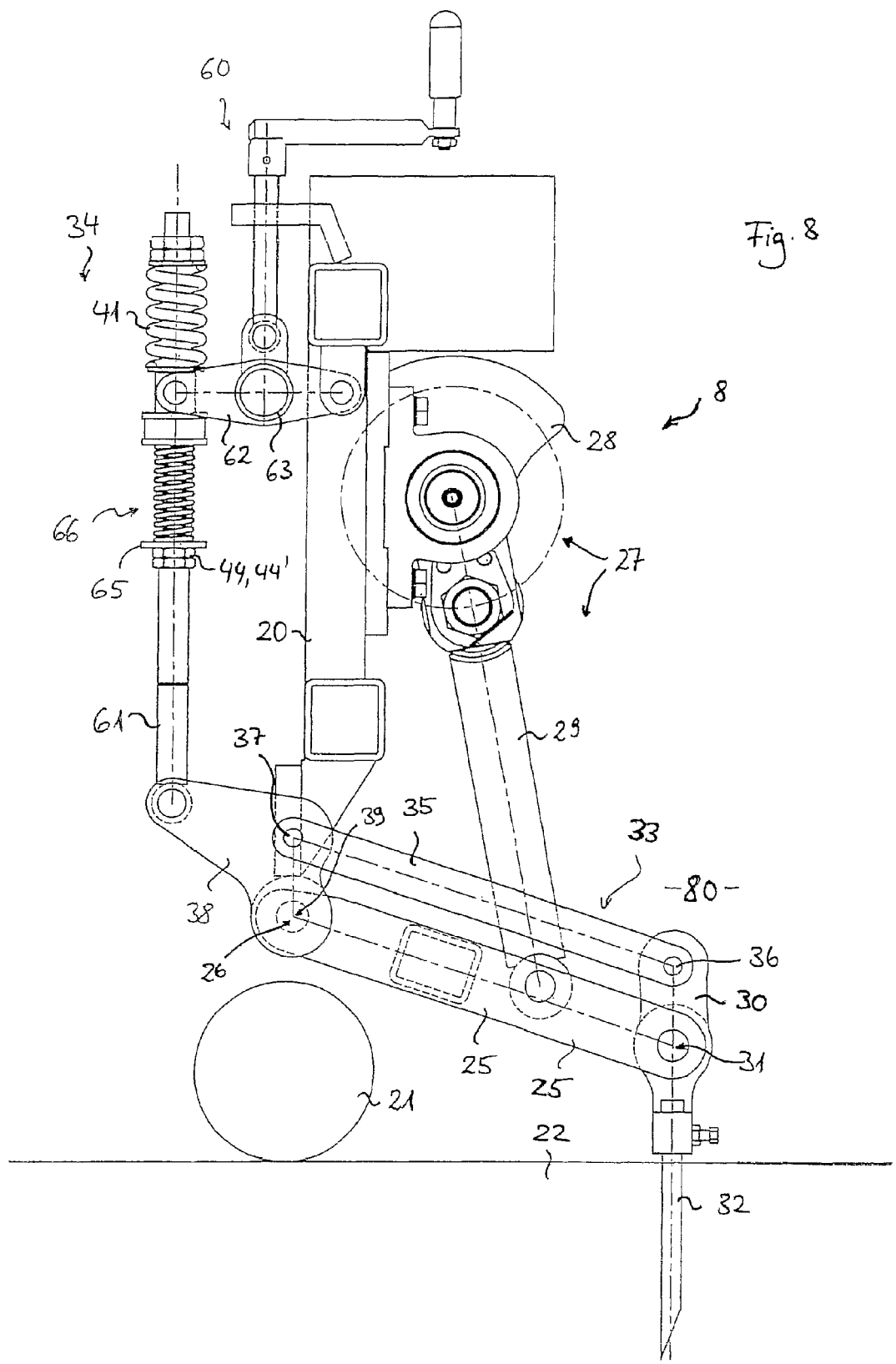
FIG. 8 shows a schematic illustration of a eighth embodiment of a soil cultivation device.

Referring now to FIG. 8 there is illustrated a soil cultivation device 8 according to an eighth embodiment which is a sophistication over the seventh embodiment as explained above in that a flexible element 66 is now disposed at the rod 61 between the buffer 43 and the projection 44 formed in this case by a ring disk element 65; this flexible element 66 cushions the impact materializing on rebound of the perforating tool and particularly also when the perforating tool comes up against rocks or the like in the ground.

Figure 9:
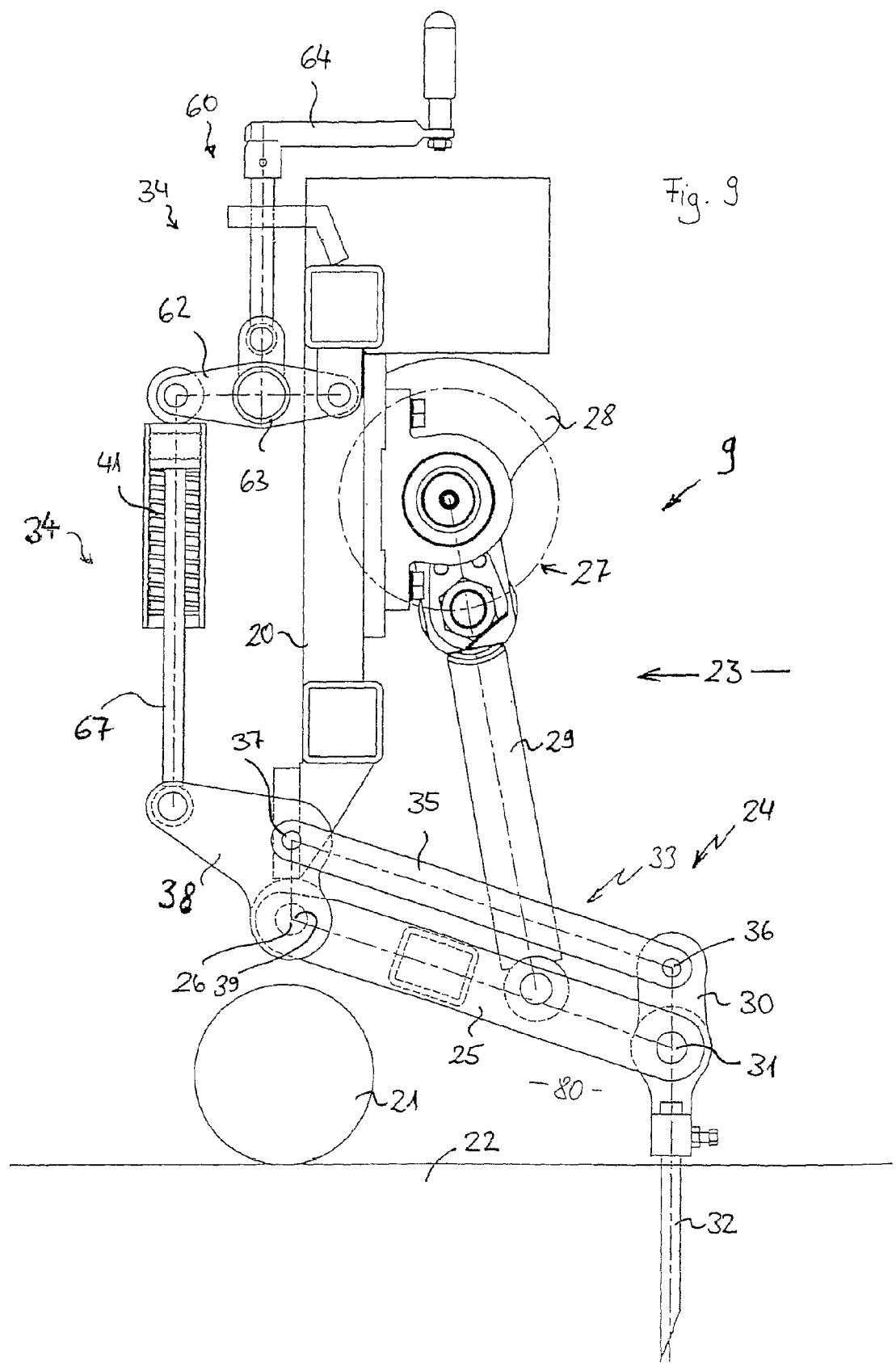
FIG. 9 shows a schematic illustration of a ninth embodiment of a soil cultivation device.

Referring now to FIG. 9 there is illustrated a soil cultivation device 9 according to a ninth embodiment which is based on the seventh embodiment, wherein the connection of the rod 61 whose length can not be changed and the compression spring 41 is replaced by a telescopic rod 67 having an inner compression spring as is known, in principle from EP 0 037 595 A1, however, there, as a handling means, that is slaved in the movement.

Figure 10:
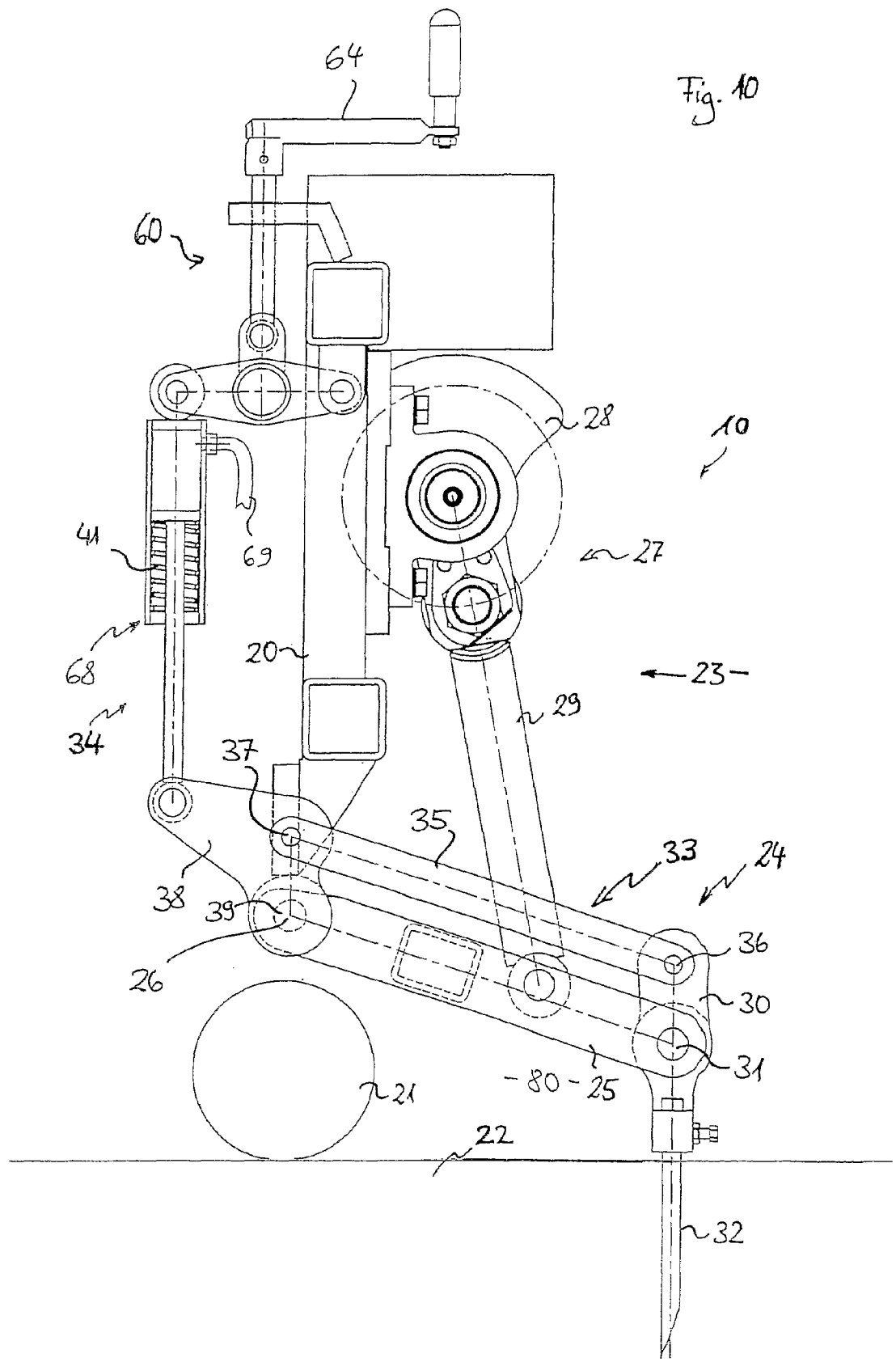
FIG. 10 shows a schematic illustration of a tenth embodiment of a soil cultivation device.

Referring now to FIG. 10 there is illustrated a soil cultivation device 10 according to a tenth embodiment which is a sophistication over the ninth embodiment in that the telescopic rod is now designed as a fluid damper 68 that can be controlled (pneumatically or hydraulically) via an external fluid port 69.

Figure 11:
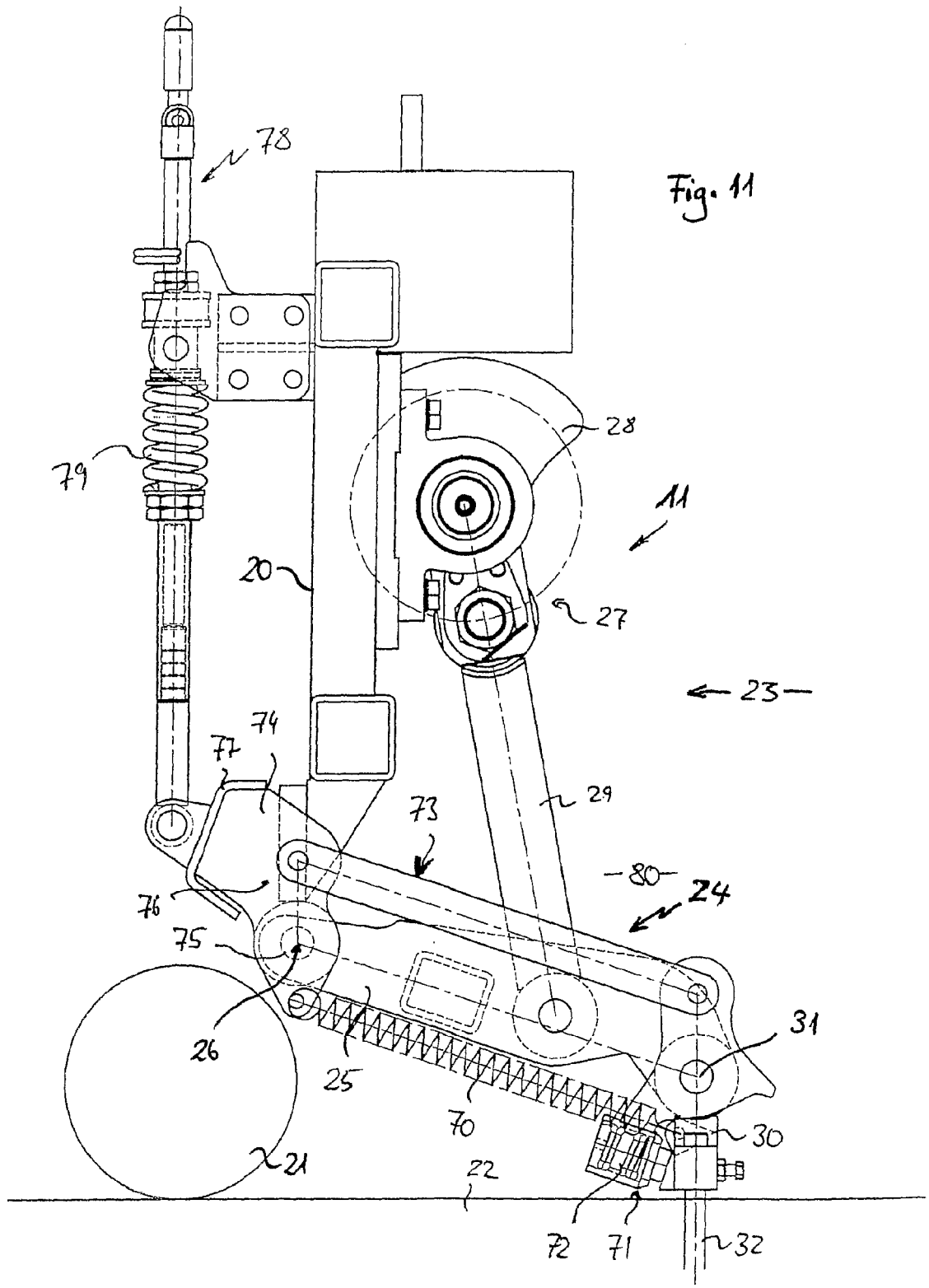
FIG. 11 shows a schematic illustration of a eleventh embodiment of a soil cultivation device.

Referring now to FIG. 11 there is illustrated a soil cultivation device 11 according to an eleventh embodiment which differs from the embodiments 1 to 10 as described before in that—as is known—handling means slaved in the movement in the form of a biasing means 70, a stop 71 and a multilayer damping member 72 accommodated therein are now provided, likewise provided is a linkage 73 with a redirecting element 74. Different, however, to the first linkage 33 the linkage 73 of the eleventh embodiment is not rigidly mounted articulated at the tool holder 30 to be slaved in the movement thereof, but instead simply mounted articulated at the stop 71 for setting thereof.

According to the eleventh embodiment, the redirecting element 74 is seated on ball bearing 75 arranged concentrically to the first pivot axis 26 the inboard race of which is fixedly connected to the supporting arm 25 to be slaved in the rotation thereof when pivoted. For this purpose there is provided at the supporting arm 25 a pin (not shown) seating the ball bearing 75. Thereby, a central angle positioner is located coaxially central into the first pivot axis. There is a bearing for this angle positioner at each supporting arm mount. The pin rotates with the supporting arm 25 and thus swings about a central axis. The ball bearing 75 is seated thereon. Seated on the ball bearing 75 is then the respective redirecting element 74, in this case in the form of a small arm 76 at the protruding end of which an adjustment rod 77 is mounted acting in common on all redirecting elements 74. This adjustment rod 77 can be pivotally adjusted centrally about the first pivot axis 26 by means of a crank 78.

The reason for this configuration is that it allows use of rolling contact bearings such as the ball bearing 75. Since the rolling contact bearings are always moved there is no longer always impact at the same location of the rolling contact bearing. With the impact as involved here quite considerable forces are communicated. If the rolling contact bearing were at rest the impact would always be at the same location which would result in the rolling contact bearing and/or its races being ruined.

In the soil cultivation device 11 the arms 76 seated at the ball bearing 75 concentric to the mounts of the supporting arm 25 protrude upwards. They are interconnected by a connection running transverse to the soil cultivation device 11, which is here an approximately 10 cm wide rod 77 made of channel-section sheet metal. The complete adjustment rod 77 is angle adjusted via the crank 78. The redirection occurs about these ball bearings 75. A compression spring 79 contacting the crank 78 cushions the impacts caused by rebound in the tool holder 30 against the stop 71.

Mounting the redirecting element 74 as explained for the eleventh embodiment can also be employed with the redirecting element 38 mounted concentrically to the first pivot axis 26 or with comparable elements of the gear mechanism in the first to tenth embodiment.

It is understood that the features explained specific to the example embodiments can, of course, be combined in further embodiments not detailed presently.

LIST OF REFERENCE NUMERALS 1 soil cultivation device (first embodiment)
2 soil cultivation device (second embodiment)
3 soil cultivation device (third embodiment)
4 soil cultivation device (fourth embodiment)
5 soil cultivation device (fifth embodiment)
6 soil cultivation device (sixth embodiment)
7 soil cultivation device (seventh embodiment)
8 soil cultivation device (eighth embodiment)
9 soil cultivation device (ninth embodiment)
10 soil cultivation device (tenth embodiment)
11 soil cultivation device (eleventh embodiment)
20 device frame
21 roller
22 ground
23 forwards direction
24 tool unit
25 supporting arm
26 first pivot axis
27 driving means or actuator
28 crank assembly
29 driving rod
30 tool holder (perforating tool articulating means)
31 second pivot axis
32 perforating tool or spike
33 linkage (gear mechanism)
34 handling means
35 rod (rigid rod element)
36 first point of articulation
37 second point of articulation
38 redirecting element
39 third pivot axis
40 variable-length rod
41 compression spring (biasing means)
42 support
43 buffer (damper device and stop)
44 projection
44' nuts
45 crank (angle positioner)
46 spindle (angle positioner)
47 tension spring (biasing means)
48 stop
49 buffer (damper means)
50 holder
51 threaded pin (angle positioner)
52 extension on redirecting element
53 compression spring (biasing means)
54 elastomer (biasing means)
55 lever element
56 elastomeric mount
60 central angle positioner
61 variable-length rod
62 adjustable support
63 setting rod
64 setting crank 65 ring disk element
66 elastic element (damper)
67 telescopic rod
68 fluid damper
69 fluid connector
70 biasing means
71 stop
72 damping member
73 linkage
74 redirecting element
75 ball bearing
76 arm
77 variable rod
78 crank
79 compression spring
80 dirt region
A articulation

The invention claimed is:

1. A soil cultivation device movable in a direction relative to the ground for subsoil loosening, comprising:
a device chassis or device frame,
a row of supporting arms each of which is articulated at a first portion thereof at the device chassis or device frame for pivoting up and down about a first pivot axis,
a driving means for driving the up and down movements of the supporting arms, and
perforating tool articulating means each for articulating a perforating tool, which is connected fixedly to the perforating tool articulating means, at a second portion for each supporting arm,
the perforating tool articulating means being articulated at the supporting arm to pivot about a second pivot axis relative to the supporting arm such that a perforating tool secured to the perforating tool articulating means can perforate the ground when the supporting arm, to which the perforating tool is connected, is lowered and that the perforating tool articulating means is pivoted in a pivoting movement relative to the supporting arm at least during perforating and further device travel of the soil cultivation device in the forwards direction,
wherein at least one gear mechanism is provided for communicating at least the pivoting movement of the perforating tool articulating means relative to the supporting arm,
wherein the pivoting movement occurs while the perforating tool is penetrating the ground and the soil cultivation device is traveling further in the forwards direction, to at least one means not slaved in the up and down movement of the supporting arm.

2. The soil cultivation device of claim 1, wherein the gear mechanism comprises a linkage articulated at the perforating tool articulating means for common movement for communicating the pivotal movement of the perforating tool articulating means relative to the supporting arm into a portion in the vicinity of the first pivot axis for biasing, control, damping, setting and/or checking or the like handling of the pivotal movement between supporting arm and perforating tool articulating means.

3. The soil cultivation device of claim 1, wherein the gear mechanism is articulated to the perforating tool articulating means for a common movement therewith to carry forward a pivotal movement of the supporting arm relatively to the perforating tool articulating means, the gear mechanism being formed of at least:
an, in operation, rigid rod which acts roughly parallel to the supporting arm and which is articulated in a first point of articulation at the perforating tool articulating means for a common movement, and
a redirecting element articulated in a second point of articulation of the rigid rod element for direct common movement for biasing, controlling, damping, setting and/or for checking or for otherwise handling the movement of the supporting arm relative to the perforating tool articulating means via the redirecting element.

4. The soil cultivation device of claim 3, wherein the effective length of the rigid rod element is selectively variable and fixable for operation.

5. The soil cultivation device of claim 1, wherein the gear mechanism includes a redirecting element for redirecting the relative movement mounted to the device frame for pivoting about a third pivot axis oriented approximately parallel to the first pivot axis and approximately parallel to the second pivot axis.

6. The soil cultivation device as set forth in claim 5, wherein the third pivot axis extends approximately concentrically to the first pivot axis.

7. The soil cultivation device of claim 1, wherein the gear mechanism includes at least one rotary or pivot bearing having a bearing axis coinciding with the first pivot axis for mounting the gear mechanism relative to the device frame, the bearing comprising two bearing elements each rotatable relative to the other, one of which is linked to the supporting arm, to which the perforating tool is connected, for common movement therewith.

8. The soil cultivation device of claim 3, wherein the redirecting element is mounted at a rotary or pivot bearing having a bearing axis coinciding with the first pivot axis for mounting the gear mechanism relative to the device frame.

9. The soil cultivation device of claim 1, wherein the gear mechanism together with the supporting arm and the perforating tool articulating means roughly forms a parallelogram guide from which the movement of the supporting arm relative to the perforating tool articulating means can be picked off substantially independent of the position and/or reciprocation of the supporting arm.

10. The soil cultivation device of claim 3, wherein the perforating tool articulating means, the supporting arm, the rod and the redirecting element form at least approximately a parallelogram guide, the redirecting element being slaved in a pivotal movement of the perforating tool articulating means so that this pivotal movement can be picked off at the redirecting element.

11. The soil cultivation device of claim 3, wherein a handling means engages the redirecting element, for at least one of handling, biasing, controlling, checking, regulating, limiting, setting and/or damping the movement of the supporting arm relative to the perforating tool articulating means.

12. The soil cultivation device as set forth in claim 11, wherein the handling means is arranged outside of a portion of the soil cultivation device exposed to soilage resulting from ground cultivation.

13. The soil cultivation device as set forth in claim 11, wherein the handling means is mounted so as not to be slaved in the movement of the supporting arm, but mounted stationary relative to the device chassis or device frame.

14. The soil cultivation device of claim 11, wherein the handling means is arranged outside of a supporting arm movement area spanned by the up and down movement of the supporting arms and the perforating tool articulating means articulated thereto and extending through the device transversely to the forwards movement thereof.

15. The soil cultivation device of claim 11, wherein the handling means is arranged outside of the movement area of the driving means.

16. The soil cultivation device of claim 11, wherein the handling means comprises:
   a biasing means for biasing the redirecting element, and thus the perforating tool articulating means, and
   a stop acting against which the linkage, particularly the redirecting element, is biased by the biasing means.

17. The soil cultivation device of claim 11, wherein the handling means includes an angle positioner for setting a perforating angle of the perforating tool.

18. The soil cultivation device as set forth in claim 17, wherein the angle positioner acts on all or on a group of the perforating tool articulating means.

19. The soil cultivation device of claim 11, wherein the handling means comprises an element for damping the relative movement when the perforating tool is retracted from the ground.

20. The soil cultivation device as set forth in claim 19, wherein the damping element is a fluid.

21. The soil cultivation device as set forth in claim 20, wherein the fluid damper is connected to a fluid port for setting.

22. The soil cultivation device of claim 1, wherein there is no biasing means that is slaved in the up and down movement of the supporting arm for biasing the perforating tool articulating means relative to the supporting arm and there is no stop slaved in the up and down movement of the supporting arm for the perforating tool articulating means.

23. A soil cultivation device as set forth in claim 7, wherein the bearing is a rolling contact bearing, an inboard race of which is mounted on a pin protruding from the supporting arm concentrically to the first pivot axis, the pin being correspondingly slaved in the rotation on pivoting of the supporting arm about the first pivot axis and that on an outboard race a redirecting element of the gear mechanism is mounted pivotable about the first pivot axis particularly for setting the position of a stop for the perforating tool articulating means.

24. A soil cultivation device movable in a direction relative to the ground for subsoil loosening, comprising:
   a device chassis or device frame,
   a row of supporting arms each of which is articulated at a first portion thereof at the device chassis or device frame for pivoting up and down about a first pivot axis,
   a driving means for driving the up and down movements of the supporting arms,
   perforating tool articulating means each for articulating a perforating tool, which is connected fixedly to the perforating tool articulating means, at a second portion for each supporting arm,
      the perforating tool articulating means being articulated at the supporting arm to pivot about a second pivot axis relative to the supporting arm such that a perforating tool secured to the perforating tool articulating means can perforate the ground when the supporting arm, to which the perforating tool is connected, is lowered and that the perforating tool articulating means is pivoted relative to the supporting arm at least during perforating and further device travel of the soil cultivation device in the forwards direction, and
   a biasing means for biasing the perforating tool articulating means against a stop, wherein a gear mechanism is provided for setting the position of the stop and thus the perforating angle of the perforating tools relative to the ground,
      wherein the gear mechanism has at least one rotary or pivot bearing having a bearing axis coinciding with the first pivot axis for mounting the gear mechanism relative to the device frame,
      the bearing comprising two bearing elements each rotatable relative to the other, one of which is connected to the assigned supporting arm for common movement therewith;
      wherein the bearing is a rolling contact bearing, an inboard race of which is mounted on a pin protruding from the supporting arm concentrically to the first pivot axis, the pin being correspondingly slaved in the rotation on pivoting of the supporting arm about the first pivot axis and that on an outboard race a redirecting element of the gear mechanism is mounted pivotable about the first pivot axis particularly for setting the position of the stop.

* * * * *